United States Patent [19]

Yoshimura

[11] 4,225,003
[45] Sep. 30, 1980

[54] IDLE-UP SYSTEM DURING A POWER STEERING OPERATION OF A VEHICLE

[75] Inventor: Takayuki Yoshimura, Toyota, Japan

[73] Assignee: Toyota Jidosha Kogyo Kabushiki Kaisha, Toyota, Japan

[21] Appl. No.: 881,897

[22] Filed: Feb. 27, 1978

[30] Foreign Application Priority Data

Nov. 8, 1977 [JP] Japan .................................. 52/133115

[51] Int. Cl.$^2$ .............................................. B62D 5/06
[52] U.S. Cl. .................................................. 180/54 G
[58] Field of Search .................. 180/132, 77 R, 54 G; 123/97 R; 60/431

[56] References Cited

U.S. PATENT DOCUMENTS

| 3,022,849 | 2/1962 | Braun | 180/77 R |
| 3,042,134 | 7/1962 | Majewski | 180/77 R |

Primary Examiner—John A. Pekar

[57] ABSTRACT

An idle-up system of a vehicle having a power steering means operates so as to detect some varied information which is presented in the steering system due to a steering operation during an idling operation of an engine of the vehicle, and then to increase idling revolutions according to the detected information.

1 Claim, 6 Drawing Figures

IDLE-UP SYSTEM DURING A POWER STEERING OPERATION OF A VEHICLE

FIELD OF THE INVENTION

The present invention relates to an idle-up system of a vehicle having power steering means and in particular to an idle-up system adapted to increase the idling revolutions of an engine through an interlocking means by detecting some varied condition in a steering system caused by the steering operation performed during an idling operation of the vehicle.

DESCRIPTION OF THE PRIOR ART

In general, the power steering means used in a vehicle is so designed as to provide an output means from a servo mechanism which is arranged in the manual steering mechanism of the vehicle; is adapted to provide a follow-up function due to manipulation of the steering wheel. Although the operational medium therefor may be obtained mechanically, electrically or from other sources, at the present time, hydraulic power is most usual.

There is the risk of stalling the engine during idling of same, or when the revolutions of the engine are at a low level, especially in the case of steering during the stationary state of the vehicle.

SUMMARY OF THE INVENTION

An object of the present invention, therefore, is to provide an idle-up system having a mechanism for increasing idling revolutions of an engine in response to some deviation from a standard steering condition in a power steering means when the vehicle is steered during idling of the engine, thereby increasing the idling revolutions of the engine by means of an idle-up mechanism by a signal derived from detection of the variation, to initiate the power steering operation, and to prevent the engine from unintentionally stalling by a steering motion during the idling operation of the vehicle.

By providing the idle-up system according to the present invention in a vehicle having power steering means, it is possible to detect some variation occurring in the steering system and instantly initiate an increase in the idling revolutions of the engine. Thus even in the case where the steering pump is subjected to some load due to the steering operation, the engine can be provided with substantial power sufficient to cope with such a load to prevent the engine from completely stalling. Especially, the idle-up system according to the present invention is highly effective for a steering operation in the case where the vehicle is standing still.

DETAILED DESCRIPTION OF THE INVENTION

Figure 1:
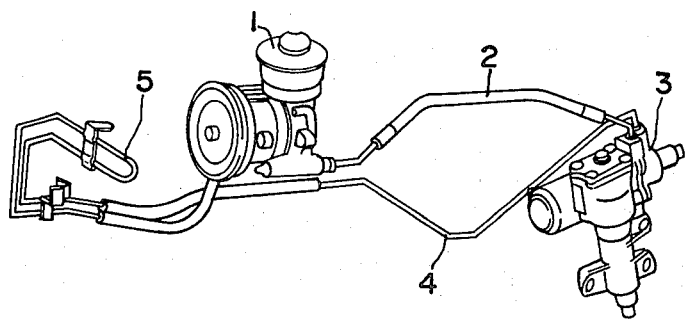
FIG. 1 is a general arrangement of a power steering system of a vehicle.
Figure 2:
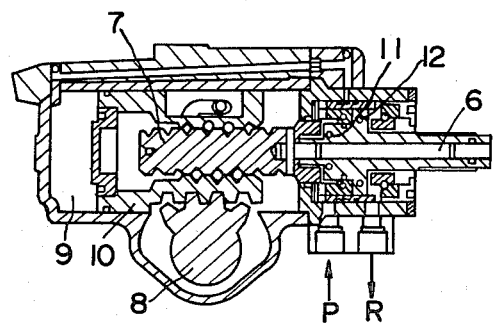
FIG. 2 is a longitudinal sectional view of a gear box of a power steering device.
Figure 3:
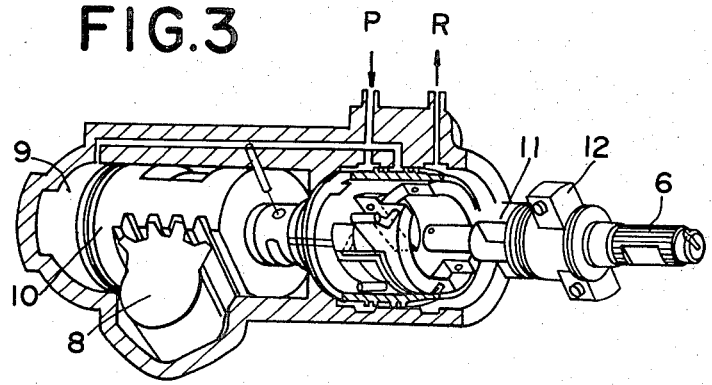
FIG. 3 shows schematically a partially perspective and partially sectional view of the gear box shown in FIG. 2.
Figure 4:
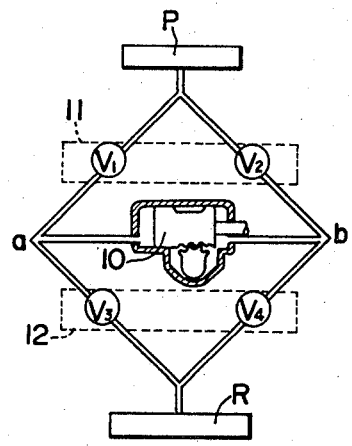
FIG. 4 schematically illustrates the principle of operation of the gear box of the power steering system.

Referring now to the accompanying drawings, and particularly in FIG. 1 which shows a general arrangement of a power steering system, a force acting on a vane pump 1 which is a hydraulic pressure source and on a steering system is detected during steering of a vehicle. This force controls hydraulic pressure in the system, while an integrated gear box 3 which transfers the controlled hydraulic pressure into mechanical power, is combined with a pressure supply hose 2, a return tubing 4 and an oil cooler 5 and forms a closed circuit. FIG. 2 shows a sectional view of a typical gear box, wherein a turning moment is transmitted from a steering wheel through a slender torsion shaft 6 to a worm shaft 7 which has coaxially arranged flapper valves 11 and 12 thereon. A cylinder 9 includes a sliding piston 10 therewithin, and the piston 10 is drivingly engaged with a center shaft 8 by a worm formed on a portion thereof. FIG. 3 is a fragmental sectional view of a gear box in which the flapper valves 11 and 12 connected to the torsion shaft are shown as being drawn away by some extent from the interior of the gear box to clarify the drawing. In FIG. 4 of the drawing, first flapper valves $V_1$ and $V_2$ act as directional control valves while second flapper valves $V_3$ and $V_4$ act as pressure control valves. In FIG. 4 which is a schematic illustration of a principle of actuation of the gear box, all valves are open when the steering wheel is in a neutral position and there exists no pressure difference between points a and b. When the steering wheel is turned leftwards, the valve $V_1$ and $V_4$ are open and valve $V_2$ is closed. Thus hydraulic pressure at point a is increased and the piston 10 is pushed to the right in the drawing and the sector shaft 8 is rotated to aid the steering operation of the driver. In the case of a right turn, the operation of the aforementioned mechanism will be reversed. Thus, the system according to the present invention is intended to suitably detect some varied phenomena such as a displacement of the piston, a pressure difference between points a and b, and other variations presented in the power steering system and, by utilizing this detected information as a medium for controlling the system, the information is caused to interlock with a movement of a throttle valve of the engine to force the idling revolutions of the engine to increase.

Figure 5:
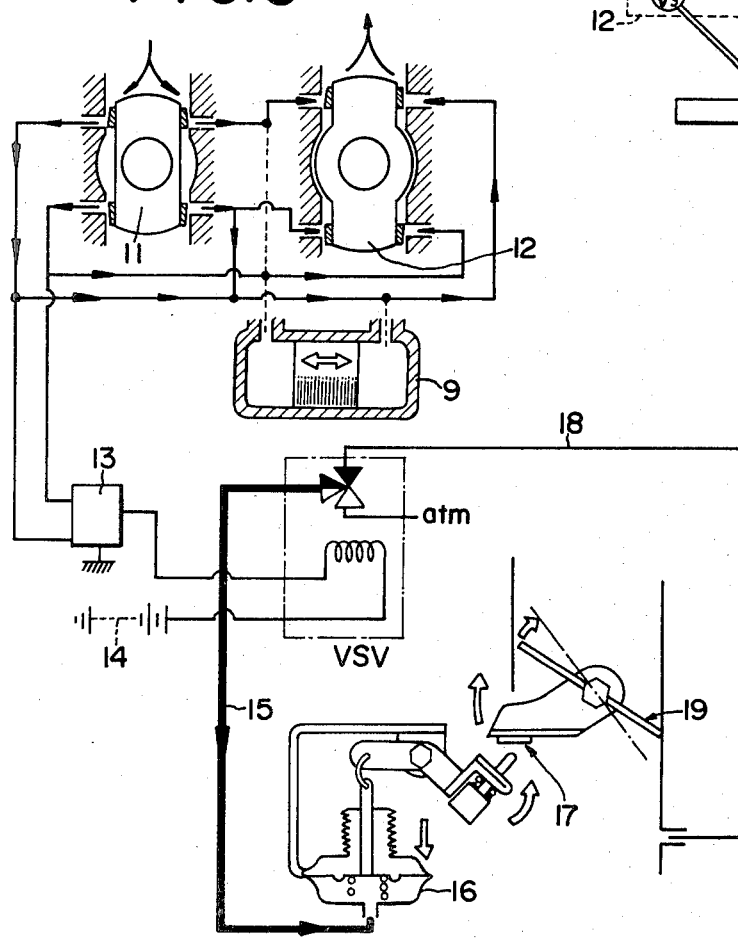
FIG. 5 is a flow chart of one embodiment of an idle-up system of a power steering system according to the present invention.

In FIG. 5 which shows an embodiment of an idle-up system according to the present invention, an operating medium of the system is a pressure difference between points a and b in FIG. 4. The flow paths of the hydraulic fluid in the flapper valved 11, 12 and the cylinder chamber 9 are shown at the upper portion of the drawing, while the lower portion thereof is the idle-up system according to the present invention which includes a pressure switch 13, an electric source 14, a vacuum switching valve VSV, a vacuum line 15, a diaphragm-type actuating mechanism 16, an adjustable interlocking mechanism 17 which interlocks with the throttle valve and an intake vacuum line 18.

Figure 6:
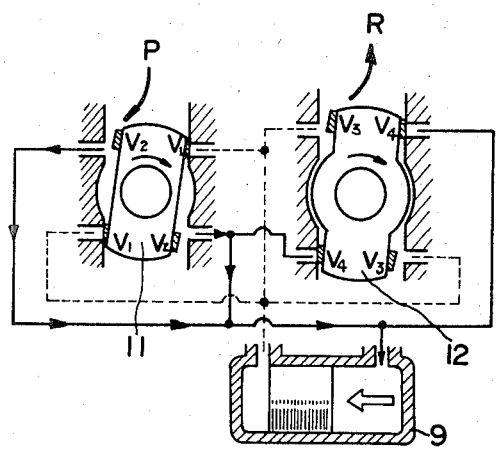
FIG. 6 shows operational features of flapper valves.

During the operation, when the steering wheel is turned in one direction, the flapper valves 11 and 12 are rotated as shown in FIG. 6 and accordingly a pressure difference is produced between points a and b as aforementioned. This pressure difference is detected by the pressure switch 13 to actuate the VSV, only during the power steering operation of the vehicle, causing actuation of the VSV to pass through the communication line 15 in order to transfer a vacuum from the intake manifold vacuum line 18 via the VSV to the diaphragm chamber of the diaphragm-type mechanism 16. The vacuum causes the throttle valve 19 to open by a required extent in cooperation with the rod-link mechanism 17 which is adapted to interlock with the diaphragm 16.

While having disclosed the constitution and function of the present invention in the specification using one embodiment which performs the idle-up operation of the throttle valve by sensing the pressure difference between two specified points, it may be possible, of course, to use one of varied indications presented in some portions in the steering system during power steering operation by detecting functional variations, movements of the parts or changes in condition, and using any one of these as an operating medium. For example, it may possible to utilize the present idle-up system in conjunction with an idle-up device for a cooling system of the prior art so as to actuate the idle-up system when either the cooling system or the power steering system is required for the idle-up operation. The pressure switch of the present invention may be substituted for a mechanical vacuum switching valve to perform the idle-up operation by actuating the vacuum switching valve by a pressure difference in the power steering system.

While a hydraulic pressure is used as the medium for detecting the situation of the system as described above, any other means for detecting variations, for example, a displacement or movement of the sector shaft (8 in FIG. 2) due to the turning of the worm in the gear box, or means for detecting the variation of position and movement of the parts which are constituted to perform a sequence of operations in the steering system from the steering wheel to the front wheels of the vehicle.

Further means for detecting a slow-down of the idling revolutions of the engine due to a load increment of the power steering pump may be used.

What is claimed is:

1. An idle-up system in a vehicle provided with a power steering means including flapper valve means, said system comprising:

an electrically operated pressure sensing means fluidly coupled to the flapper valve means for sensing a difference of pressures acting on one side and the other side of a piston in a power cylinder of the power steering means during a steering operation;

an electromagnetic vacuum switching valve responsive to said pressure sensing means and having a vacuum opening communicating with a vacuum port of a carburetor of the engine through an intake vacuum line and an atmosphere opening and adapted to be, actuated by said pressure sensing means when said pressure sensing means detects a pressure difference across the piston to effect a switching operation between said vacuum opening and said atmosphere opening;

a source of electric power electrically connected to said electromagnetic vacuum switching valve;

a diaphragm-type actuating mechanism fluidly coupled to said vacuum switching valve and comprising a diaphragm chamber communicating with said vacuum opening of said vacuum switching valve via a vacuum line and means moveable with said diaphragm in response to the motion thereof; and interlocking means arranged between said means moveable with said diaphragm and a throttle valve of the carburetor, said interlocking means being operable to open said throttle valve by a predetermined extent in response to the vacuum communicating operation of said electromagnetic vacuum switching valve.

* * * * *